United States Patent
Nie et al.

(10) Patent No.: US 11,240,198 B2
(45) Date of Patent: Feb. 1, 2022

(54) SESSION MANAGEMENT METHOD AND APPARATUS

(71) Applicant: HUAWEI TECHNOLOGIES CO., LTD., Guangdong (CN)

(72) Inventors: Shengxian Nie, Shanghai (CN); Runze Zhou, Shanghai (CN); Zhongping Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/928,331

(22) Filed: Jul. 14, 2020

(65) Prior Publication Data

US 2020/0344204 A1 Oct. 29, 2020

Related U.S. Application Data

(63) Continuation of application No. PCT/CN2019/071739, filed on Jan. 15, 2019.

(30) Foreign Application Priority Data

Jan. 15, 2018 (CN) .......................... 201810037054.3

(51) Int. Cl.
*H04L 29/12* (2006.01)
*H04L 29/08* (2006.01)

(52) U.S. Cl.
CPC ...... *H04L 61/2046* (2013.01); *H04L 61/2007* (2013.01); *H04L 67/141* (2013.01)

(58) Field of Classification Search
CPC H04L 61/2046; H04L 61/2007; H04L 67/141
See application file for complete search history.

(56) References Cited

U.S. PATENT DOCUMENTS

| | | | | |
|---|---|---|---|---|
| 2014/0105145 A1* | 4/2014 | Gao | .................... | H04W 84/045 370/329 |
| 2015/0110095 A1* | 4/2015 | Tan | .......................... | H04L 63/20 370/338 |
| 2015/0282017 A1* | 10/2015 | Wang | ...................... | H04W 8/02 370/331 |
| 2017/0245207 A1* | 8/2017 | Stammers | ............... | H04W 8/24 |

(Continued)

FOREIGN PATENT DOCUMENTS

| | | |
|---|---|---|
| CN | 106900081 A | 6/2017 |
| CN | 107517480 A | 12/2017 |

(Continued)

OTHER PUBLICATIONS

3GPP TS 23.501 V15.0.0 (Dec. 2017), "3rd Generation Partnership Project; Technical Specification Group Services and System Aspects; System Architecture for the 5G System; Stage 2 (Release 15)," 181 pages.

(Continued)

*Primary Examiner* — Christopher B Robinson
(74) *Attorney, Agent, or Firm* — Fish & Richardson P.C.

(57) ABSTRACT

Example session management methods and apparatus are described. One example method includes allocating a first IP address and a first user plane network element to a terminal by a session management network element. The first user plane network element allocated to the terminal supports the first IP address.

19 Claims, 6 Drawing Sheets

(56) References Cited

U.S. PATENT DOCUMENTS

2017/0339609 A1* 11/2017 Youn .................. H04W 76/11
2019/0223060 A1* 7/2019 Zhou .................. H04W 36/30

FOREIGN PATENT DOCUMENTS

| EP | 3171542 A1 | 5/2017 | | |
|---|---|---|---|---|
| WO | 2017197273 A1 | 11/2017 | | |
| WO | WO-2018006878 A1 * | 1/2018 | ............ | H04W 76/22 |

OTHER PUBLICATIONS

3GPP TS 23.502 V15.0.0 (Dec. 2017), "3rd Generation Partnership Project; Technical Specification Group Services and System Aspects; Procedures for the 5G System; Stage 2(Release 15)," Dec. 2017, 257 pages.

3GPP TS 29.244 V15.0.0 (Dec. 2017), "3rd Generation Partnership Project; Technical Specification Group Core Network and Terminals; Interface between the Control Plane and the User Plane Nodes; Stage 3(Release 15)," Dec. 2017, 157 pages.

Nokia et al., "23.501 § 5.8: IP address allocation for a PDU session and forwarding realms," SA WG2 Meeting #122, S2-174716, Los Cabos, Mexico, Jun. 26-30, 2017, 4 pages.

Office Action issued in Chinese Application No. 201810037054.3 dated Mar. 9, 2020, 13 pages (with English translation).

PCT International Search Report and Written Opinion issued in International Application No. PCT/CN2019/071739 dated Apr. 17, 2019, 10 pages (with English translation).

T-Mobile USA Inc, "Enhancing IP Allocation between UPF and SMF," SA WG2 Meeting #120, S2-172030, Busan, South Korea (revision of S2-170951), Mar. 27-31, 2017, 4 pages.

3GPP TS 23.501 V0.2.0 (Jan. 2017), "3rd Generation Partnership Project; Technical Specification Group Services and System Aspects; System Architecture for the 5G System; Stage 2 (Release 15)," Jan. 2017, 69 pages.

3GPP TS 23.502 V1.4.0 (Dec. 2017), "3rd Generation Partnership Project; Technical Specification Group Services and System Aspects; Procedures for the 5G System; Stage 2 (Release 15)," Dec. 2017, 261 pages.

Extended European Search Report issued in European Application No. 19738955.4 dated Feb. 4, 2021, 10 pages.

Nokia et al., "23.501 5.8: IP address allocation for a PDU session," SA WG2 Meeting #122, S2-174158, Los Cabos, Mexico, Jun. 26-30, 2017, 4 pages.

Office Action issued in Indian Application No. 202027030439 dated Aug. 30, 2021, 6 pages.

* cited by examiner

SESSION MANAGEMENT METHOD AND APPARATUS

CROSS-REFERENCE TO RELATED

This application is a continuation of International Application No. PCT/CN2019/071739, filed on Jan. 15, 2019, which claims priority to Chinese Patent Application No. 201810037054.3, filed on Jan. 15, 2018. The disclosures of the aforementioned applications are hereby incorporated by reference in their entireties.

TECHNICAL FIELD

This application relates to the field of mobile communications technologies, and in particular, to a session management method and apparatus.

BACKGROUND

In a core network, one user plane function (user plane function, UPF) network element may be managed by one or more session management function (session management function, SMF) network elements, and one SMF network element may manage one or more UPF network elements. For one UPF network element, all IP addresses supported by an SMF network element that manages the UPF network element may be allocated to the UPF network element. It may also be understood as that IP addresses supported by the UPF network element are all internet protocol (internet protocol, IP) addresses supported by the SMF network element that manages the UPF network element.

Currently, in some specific scenarios, for example, for an enterprise network, a dedicated UPF network element is deployed in the enterprise network. Because the enterprise network opens a connection only to a specific user, and a quantity of users is usually relatively small, IP addresses that can be allocated by the dedicated UPF network element to user sessions are limited. In other words, IP addresses supported by the dedicated UPF network element are limited. Generally, the IP addresses supported by the dedicated UPF network element are some of IP addresses supported by an SMF network element that manages the dedicated UPF network element. If the SMF randomly allocates an IP address to the user, a data network of the enterprise network cannot provide a service for the user.

SUMMARY

This application provides a session management method and apparatus, to establish a session between a terminal and a data network.

According to a first aspect, this application provides a session management method, where the method includes: receiving, by a session management network element, a first message from a terminal, where the first message is used to request to establish a session; allocating, by the session management network element, a first internet protocol IP address to the terminal; determining, by the session management network element for the terminal based on the first IP address and correspondences between user plane network elements and IP addresses supported by the user plane network elements, a first user plane network element that supports the first IP address; and sending, by the session management network element, the first IP address to the terminal, and notifying the first user plane network element to establish the session.

According to the foregoing method, the session management network element allocates the first IP address and the first user plane network element to the terminal, and the first user plane network element allocated to the terminal supports the first IP address. This helps avoid allocating, to the terminal, a user plane network element that does not support the first IP address, and further helps avoid resource waste caused by re-allocating an IP address or reselecting a user plane network element for a plurality of times.

In a possible implementation, the determining, by the session management network element for the terminal based on the first IP address and correspondences between user plane network elements and IP addresses supported by the user plane network elements, a first user plane network element that supports the first IP address includes: determining, by the session management network element based on the first IP address and the correspondences between the user plane network elements and the IP addresses supported by the user plane network elements, that a plurality of user plane network elements support the first IP address; and selecting, by the session management network element, a user plane network element from the plurality of user plane network elements as the first user plane network element.

In a possible implementation, the session management network element obtains, from the user plane network elements, the correspondences between the user plane network elements and the IP addresses supported by the user plane network elements; or the session management network element configures the correspondences between the user plane network elements and the IP addresses supported by the user plane network elements.

In a possible implementation, the IP addresses supported by the user plane network element are some or all of the IP addresses supported by the session management network element.

In a possible implementation, the session management network element obtains a data network identifier based on the first message, subscription data, or local information, where the data network identifier is used to identify a data network DN to which the terminal requests to establish the session; and the allocating, by the session management network element, a first IP address to the terminal includes:

allocating, by the session management network element to the terminal, the first IP address supported by the data network identifier.

In a possible implementation, the notifying, by the session management network element, the first user plane network element to establish the session specifically includes: sending, by the session management network element, the first IP address to the first user plane network element.

According to a second aspect, this application provides a session management method, where the method includes: receiving, by a session management network element, a first message from a terminal, where the first message is used to request to establish a session; determining, by the session management network element, a first user plane network element for the terminal; allocating, by the session management network element to the terminal based on correspondences between the first user plane network element and IP addresses supported by the first user plane network element, a first IP address supported by the first user plane network element; and sending, by the session management network element, the first IP address to the terminal, and notifying the first user plane network element to establish the session.

According to the foregoing method, the session management network element allocates the first IP address and the first user plane network element to the terminal, and the first user plane network element allocated to the terminal supports the first IP address. This helps avoid allocating, to the terminal, a user plane network element that does not support the first IP address, and further helps avoid resource waste caused by re-allocating an IP address or reselecting a user plane network element for a plurality of times.

In a possible implementation, the session management network element obtains, from the first user plane network element, the correspondences between the first user plane network element and the IP addresses supported by the first user plane network element; or the session management network element configures the correspondences between the first user plane network element and the IP addresses supported by the first user plane network element.

In a possible implementation, the IP addresses supported by the first user plane network element are some or all of the IP addresses supported by the session management network element.

In a possible implementation, the session management network element obtains a data network identifier based on the first message, subscription data, or local information, where the data network identifier is used to identify a data network DN to which the terminal requests to establish the session; and the determining, by the session management network element, a first user plane network element for the terminal includes:

determining, by the session management network element for the terminal, the first user plane network element supported by the data network identifier.

In a possible implementation, the notifying, by the session management network element, the first user plane network element to establish the session specifically includes: sending, by the session management network element, the first IP address to the first user plane network element.

According to a third aspect, this application provides a session management method, where the method includes: receiving, by a user plane network element, a second message of a session management network element, where the second message is used to request to obtain IP addresses supported by the user plane network element; and sending, by the user plane network element to the session management network element, the IP addresses supported by the user plane network element.

According to the foregoing method, the session management network element may obtain, from the user plane network elements, the IP addresses supported by the user plane network element. Therefore, when the user plane network element is allocated to a terminal, the user plane network element that supports the IP addresses allocated to the terminal is allocated to the terminal, thereby avoiding resource waste caused by re-allocating an IP address or reselecting a user plane network element for a plurality of times.

In a possible implementation, the session management network element is any one of session management network elements that manage the user plane network element, and the IP addresses separately supported by the session management network elements that manage the user plane network element are different.

In a possible implementation, the user plane network element is deployed for a specific data network.

In a possible implementation, the IP addresses that are supported by the user plane network element and that are sent to the session management network element are some or all of the IP addresses supported by the session management network.

In a possible implementation, if a plurality of session management network elements manage the user plane network element, when the IP addresses that are supported by the user plane network element and that are sent to the session management network element are some of the IP addresses supported by the user plane network element, the IP addresses that are supported by the user plane network element and that are sent to the session management network elements are different.

According to a fourth aspect, this application provides an apparatus. The apparatus may be a session management network element, or may be a chip or a circuit. The apparatus has a function of implementing the embodiments of the first aspect. The function may be implemented by hardware, or may be implemented by hardware by executing corresponding software. The hardware or the software includes one or more modules corresponding to the foregoing function.

According to a fifth aspect, this application provides an apparatus, including a processor and a memory, where the memory is adapted to store an instruction. When the apparatus is run, the processor executes the instruction stored in the memory, to enable the apparatus to perform the session management method according to the first aspect or any one of the implementations of the first aspect. It should be noted that the memory may be integrated into the processor, or may be independent of the processor.

According to a sixth aspect, this application provides an apparatus. The apparatus includes a processor, where the processor is adapted to be coupled to a memory, read an instruction in the memory, and perform, based on the instruction, the session management method according to the first aspect or any one of the implementations of the first aspect.

According to a seventh aspect, this application provides an apparatus. The apparatus may be a session management network element, or may be a chip or a circuit. The apparatus has a function of implementing the embodiments of the second aspect. The function may be implemented by hardware, or may be implemented by hardware by executing corresponding software. The hardware or the software includes one or more modules corresponding to the foregoing function.

According to an eighth aspect, this application provides an apparatus, including a processor and a memory, where the memory is adapted to store an instruction. When the apparatus is run, the processor executes the instruction stored in the memory, to enable the apparatus to perform the session management method according to the second aspect or any one of the implementations of the second aspect. It should be noted that the memory may be integrated into the processor, or may be independent of the processor.

According to a ninth aspect, this application provides an apparatus. The apparatus includes a processor, where the processor is adapted to be coupled to a memory, read an instruction in the memory, and perform, based on the instruction, the session management method according to the second aspect or any one of the implementations of the second aspect.

According to a tenth aspect, this application provides an apparatus. The apparatus may be a user plane network element, or may be a chip or a circuit. The apparatus has a function of implementing the embodiments of the third aspect. The function may be implemented by hardware, or may be implemented by hardware by executing corresponding software. The hardware or the software includes one or more modules corresponding to the foregoing function.

According to an eleventh aspect, this application provides an apparatus, including a processor and a memory, where the memory is adapted to store an instruction. When the apparatus is run, the processor executes the instruction stored in the memory, to enable the apparatus to perform the session management method according to the third aspect or any one of the implementations of the third aspect. It should be noted that the memory may be integrated into the processor, or may be independent of the processor.

According to a twelfth aspect, this application provides an apparatus. The apparatus includes a processor, where the processor is adapted to be coupled to a memory, read an instruction in the memory, and perform, based on the instruction, the session management method according to the third aspect or any one of the implementations of the third aspect.

According to a thirteenth aspect, this application further provides a readable storage medium, where the readable storage medium stores a program or an instruction. When the program or the instruction is run on a computer, any session management method according to the foregoing aspects is performed.

According to a fourteenth aspect, this application further provides a computer program product including an instruction. When the computer program product is run on a computer, the computer is enabled to perform any session management method according to the foregoing aspects.

According to a fifteenth aspect, this application further provides a system. The system includes a session management network element, where the session management network element may be adapted to perform the step performed by the session management network element in the first aspect and any method in the first aspect. In a possible design, the system may further include a user plane network element, where the user plane network element may be adapted to perform the step performed by the first user plane network element in the first aspect and any method in the first aspect or the solutions provided in the embodiments of the present invention. In a possible design, the system may further include another device such as a terminal device that interacts with the session management network element and/or the user plane network element in the solutions provided in the embodiments of the present invention.

According to a sixteenth aspect, this application further provides a system. The system includes a session management network element, where the session management network element may be adapted to perform the step performed by the session management network element in the second aspect and any method in the second aspect. In a possible design, the system may further include a user plane network element, where the user plane network element may be adapted to perform the step performed by the first user plane network element in the second aspect and any method in the second aspect or the solutions provided in the embodiments of the present invention. In a possible design, the system may further include another device such as a terminal device that interacts with the session management network element and/or the user plane network element in the solutions provided in the embodiments of the present invention.

According to a seventeenth aspect, this application further provides a system. The system includes a user plane network element, where the user plane network element may be adapted to perform the step performed by the user plane network element in the third aspect and any method in the third aspect. In a possible design, the system may further include a session management network element, where the session management network element may be adapted to perform the step performed by the session management plane network element in the third aspect and any method in the third aspect or the solutions provided in the embodiments of the present invention. In a possible design, the system may further include another device such as a terminal device that interacts with the session management network element and/or the user plane network element in the solutions provided in the embodiments of the present invention.

The aspects or other aspects in this application are more concise and easily understandable in descriptions of the following embodiments.

DESCRIPTION OF EMBODIMENTS

The following further describes in detail this application with reference to accompanying drawings. A specific operation method in a method embodiment may be applied to an apparatus embodiment or a system embodiment. In the description of this application, unless otherwise stated, "multiple" means two or more than two.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
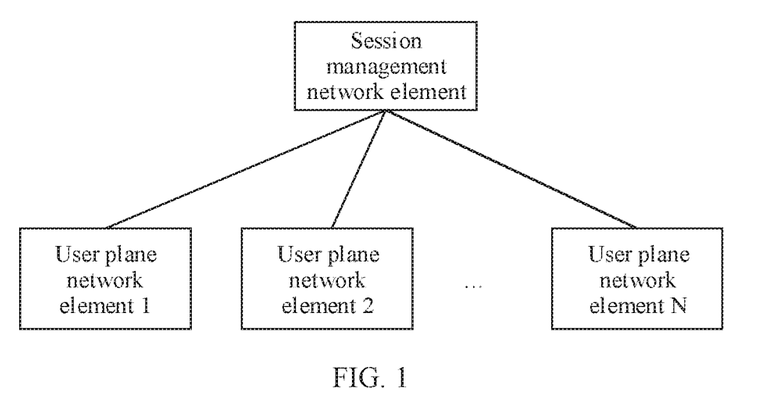
FIG. 1 is a schematic diagram of a possible network architecture according to this application.

FIG. 1 is a schematic diagram of a possible network architecture to which this application is applicable. The network architecture includes a session management network element and at least one user plane network element managed by the session management network element. For example, the session management element in FIG. 1 manages N user plane network elements, and N is a positive integer. That the session management network element manages the user plane network elements may be understood as that the session management network element controls the user plane network elements.

The session management network element is mainly responsible for session management functions in a mobile network, such as session establishment, modification and release. Specific functions may be allocating an IP address to a user, selecting a user plane function network element that provides a message forwarding function, and the like. In a 5th generation (5th generation, 5G) network, the session management network element may be an SMF network element. In future communication, for example, in a 6th generation (6th generation, 6G) network, the session management network element may still be an SMF network element or may have another name. This is not limited in this application.

The user plane network element is mainly responsible for processing a user packet, such as forwarding and charging. In 5G, the user plane network element may be a UPF network element. In future communication, for example, in 6G, the user plane network element may still be a UPF network element or may have another name. This is not limited in this application.

In this application, based on the network architecture shown in FIG. 1, an IP address is allocated to a terminal and a user plane network element is selected for the terminal, and the selected user plane network element supports the IP address.

The terminal is a device having a radio communications function. The device may be deployed on land, including an indoor or outdoor device, a handheld device, or a vehicle-mounted device, or may be deployed on water (for example, on a ship), or may be deployed in air (for example, on an air plane, a balloon, or a satellite). The terminal may be a mobile phone (mobile phone), a tablet computer (Pad), a computer having wireless sending and receiving functions, a virtual reality (virtual reality, VR) terminal, an augmented reality (augmented reality, AR) terminal, a wireless terminal in industrial control (industrial control), a wireless terminal in self-driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), and the like. The terminal may further be user equipment (user equipment, UE), a mobile station (mobile station, MS), or a terminal device (terminal device) in various forms.

It may be understood that the network element may be a network element in a hardware device, or may run a software function on dedicated hardware, or may be an instantiated virtualization function on a platform (for example, a cloud platform).

For ease of description, in this application, the session management network element is subsequently referred to as an SMF network element, and the user plane network element is referred to as a UPF network element. For ease of description, further, the SMF network element is referred to as an SMF for short, and the UPF network element is referred to as a UPF for short. It may be understood that the SMF in the following description may be replaced with the session management network element, and the UPF may be replaced with another user plane network element. This is uniformly described herein. Details are not described again in the following.

In some application scenarios, a network needs to allocate an IP address to the terminal, and allocate, to the terminal, a UPF for accessing a data network (data network, DN) by the user. For example, in a scenario in which the terminal initiates session establishment, an IP address and a UPF need to be allocated to a session of the terminal, and the terminal is connected to the DN by using the UPF. The IP address uniquely identifies the terminal in the network, and a data connection between the terminal and the data network is established, so that data in the data network may be accessed by using the UPF.

Currently, in some specific scenarios, for example, in an enterprise network, IP addresses that can be supported by a UPF are limited, and IP addresses supported by a data network are also limited. Therefore, in this scenario, how to select a suitable IP address and a suitable UPF for the terminal is a problem that needs to be resolved. It may be understood that the enterprise network is merely an example, and the scenario is not limited to the enterprise network in the embodiments of the present invention. The embodiments of the present invention may also be applied to a scenario in which IP addresses supported by another UPF are limited.

Figure 2:
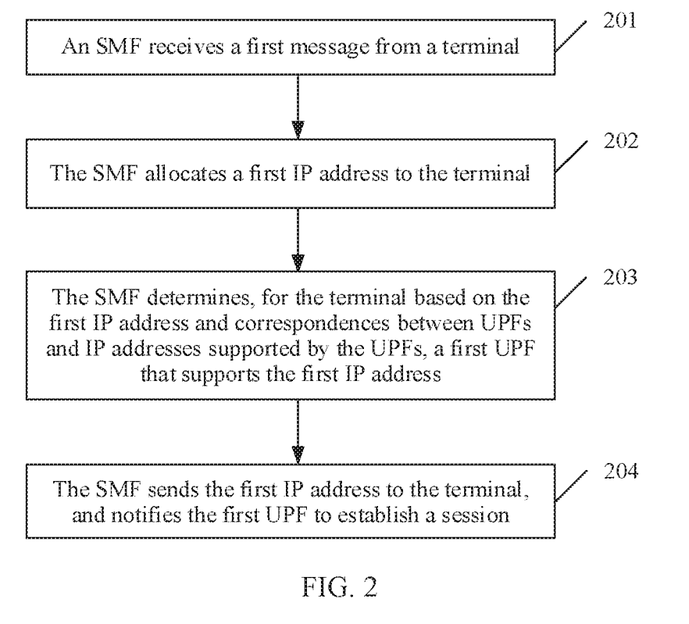
FIG. 2 is a schematic diagram of a session management method according to this application.

FIG. 2 shows a session management method according to this application. The method may be used to resolve the foregoing problem. The method includes the following steps.

Step 201. An SMF receives a first message from a terminal, where the first message is used to request to establish a session.

In a procedure in which the terminal initiates session establishment, the terminal sends the first message (for example, the first message is a session establishment request message) to an access and mobility management function (access and mobility management function, AMF) network element. The first message includes a data network identifier (for example, the data network identifier may be a data network name (data network name, DNN)), session management information, network slice information, and the like.

The session establishment may be understood as establishing a connection between the terminal and a data network, including allocating an IP address to the terminal, selecting a UPF, and delivering a data processing rule, such as a data packet detection rule, a data packet forwarding rule, or a service quality control rule, to a corresponding UPF. In the session establishment process, the UPF may not sense information about the terminal, such as a terminal identifier and a user identifier. However, the SMF may deliver various rules to the UPF, so that the UPF can complete data transmission between the terminal and the data network.

It should be noted that the first message may have another name. The name of the message is not specifically limited in this application.

For ease of description, an example in which the data network identifier is the DNN is used for description subsequently. Any place in which the DNN is used for description may be replaced with the data network identifier. Details are not described subsequently.

In still another implementation, the first message may not carry the DNN. After receiving the first message, the SMF can obtain subscription data based on user information (for example, the user identifier) carried in the first message, and obtain one DNN from the subscription data.

In still another implementation, before the session establishment, the SMF obtains the DNN from an application server or a policy control network element, and stores the DNN locally. Then, in the procedure in which the terminal initiates session establishment, the SMF receives the first message sent by the terminal, where the first message may not carry the DNN. In this case, the SMF can determine a DNN of the session based on the user information carried in the first message and the locally stored DNN.

Therefore, the SMF can obtain the DNN based on the first message. The DNN is used to identify the data network DN to which the terminal requests to establish the session. For example, the DN may be an enterprise network, and has a specific usage range. Therefore. IP addresses supported by the DNN are also limited. That the IP addresses are limited means that only specific IP addresses can be used, for example, a specific IP address segment.

The IP addresses supported by the DNN may be understood as the IP addresses allocated to terminals that access the DNN. For example, when an operator configures an available IP address for the data network, IP address segments configured for different data networks are different, and the SMF can allocate the IP address to the terminal only in an available IP address range.

The session management information may include session-related context information such as a session identifier and a user capability. For example, the session identifier may identify a session that is requested to be established. The user capability may be used as a condition for selecting the UPF, and only a UPF that meets the user capability may be selected. The network slice information indicates in which network slice, or network slice that meets what conditions, the session required to be established. Correspondingly, a network element serving the session, for example, the UPF, needs to support the network slice or belongs to the network slice.

Step 202. The SMF allocates a first IP address to the terminal.

The SMF stores correspondences between the DNN and IP addresses supported by the DNN. Therefore, the SMF can allocate the IP address to the terminal based on the IP addresses supported by the DNN.

For example, if the IP addresses that are supported by the DNN and that are stored in the SMF are IP 1 to IP 10, the SMF can allocate the IP address to the terminal from IP 1 to IP 10. Specifically, the SMF allocates the IP address to the session requested by the terminal to be established. The allocated IP address may be referred to as the first IP address.

In an alternative manner, the SMF may alternatively request an external network element to allocate the first IP address to the terminal. For a specific allocation manner, refer to a related solution in the prior art. This is not specifically limited in this application.

Step 203. The SMF determines, for the terminal based on the first IP address and correspondences between UPFs and IP addresses supported by the UPFs, a first UPF that supports the first IP address.

The SMF stores IP addresses supported by UPFs managed by the SMF. In other words, the SMF stores the correspondences between the UPFs managed by the SMF and the IP addresses supported by the UPFs. In an implementation, the correspondences between the UPFs and IP addresses supported by the UPFs may be configured on the SMF in a preconfiguration manner. In another implementation, the SMF may separately request each UPF managed by the SMF to obtain a correspondence between a UPF and an IP address supported by the UPF.

The IP address supported by any UPF in the UPFs managed by the SMF is some or all of the IP addresses supported by the SMF.

The SMF stores DNNs supported by the UPFs managed by the SMF. In other words, the SMF stores correspondences between the UPFs managed by the SMF and the DNNs supported by the UPFs. In an implementation, the correspondences between the UPFs and the DNNs supported by the UPFs may be configured on the SMF in a preconfiguration manner. In another implementation, the SMF may separately request the UPFs managed by the SMF to obtain a correspondence between a UPF and a DNN supported by the UPF.

Figure 3:
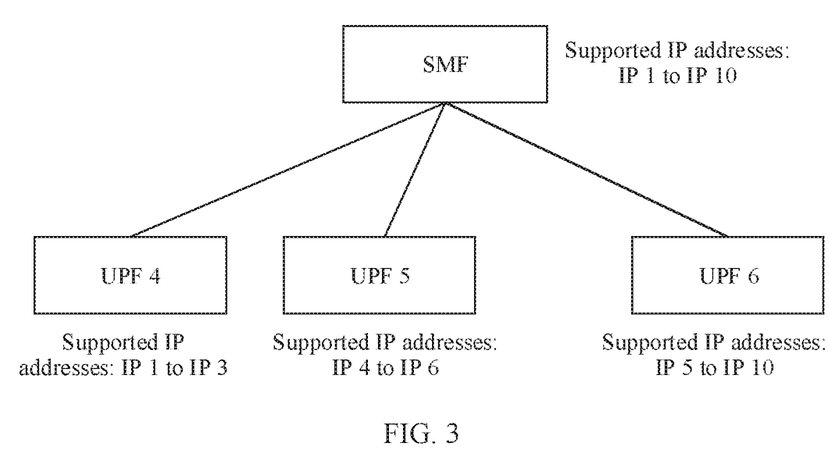
FIG. 3 is an example diagram of UPF allocation according to this application.

FIG. 3 is an example diagram of UPF allocation according to this application. It is assumed that UPFs managed by the SMF are a UPF 4, a UPF 5, and a UPF 6. IP addresses supported by the SMF (which may also be referred to as IP addresses that can be allocated by the SMF) are IP 1 to IP 10, the UPF 4 supports IP 1 to IP 3, the UPF 5 supports IP 4 to IP 6, and the UPF 6 supports IP 5 to IP 10.

The SMF stores the following correspondences.

UPF 4: IP addresses IP 1 to IP 3 are supported.
UPF 5: IP addresses IP 4 to IP 6 are supported.
UPF 6: IP addresses IP 5 to IP 10 are supported.

Assuming that the first IP allocated to the terminal in step 202 is IP 1, in step 203, the UPF selected by the SMF for the terminal is the UPF 4, and the UPF 4 is also referred to as the first UPF.

In another case, if the SMF determines, based on the first IP address and the correspondences between the UPFs and IP addresses supported by the UPFs, that a plurality of UPFs support the first IP address, the SMF selects a UPF from the UPFs as the first UPF. For example, assuming that the first IP address allocated to the terminal in step 202 is IP 5, the SMF determines that UPFs that support the first IP address are the UPF 5 and the UPF 6, and the SMF can select for the terminal, one UPF from the UPF 5 and the UPF 6 as the first UPF allocated to the terminal. For example, the SMF may select one UPF from the UPF 5 and the UPF 6 as the first UPF based on a load status of the UPF, a supported capability (for example, whether caching is supported or whether local split is supported), information about the terminal (for example, a capability of the terminal or a location of the terminal), and the like.

Step 204. The SMF sends the first IP address to the terminal, and notifies the first UPF to establish the session.

After the SMF allocates the first IP address to the terminal and selects the first UPF, the SMF separately sends the first IP address to the terminal and the first UPF, and notifies the first UPF to establish the session.

In the session establishment process, the first UPF may not sense the information about the terminal, such as the terminal identifier and the user identifier. However, the SMF may deliver various rules (for the rules, refer to the description in 201) to the first UPF, where the rules include the first IP address. In this way, the first UPF can establish a session to complete data transmission between the terminal and the data network.

According to the foregoing method, the SMF allocates the first IP address and the first UPF to the terminal, and the first UPF allocated to the terminal supports the first IP address. This helps avoid allocating, to the terminal, a UPF that does not support the first IP address, and further helps avoid resource waste caused by re-allocating an IP address or reselecting an UPF for a plurality of times.

Figure 4:
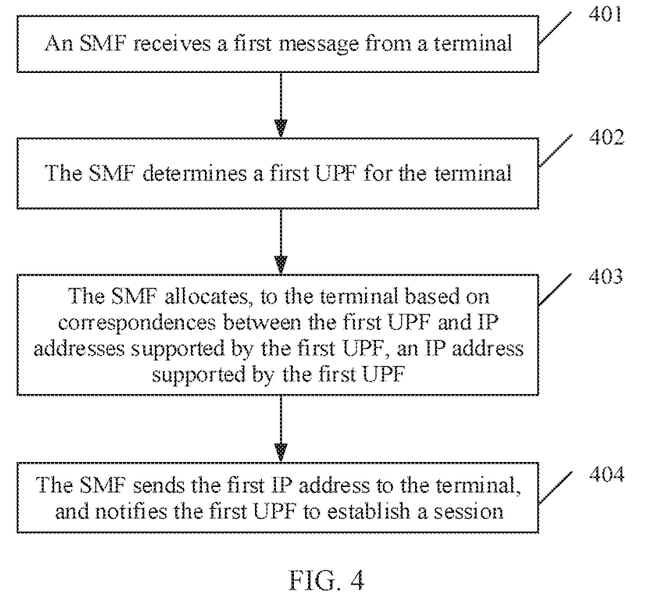
FIG. 4 is a schematic diagram of another session management method according to this application.

FIG. 4 shows another session management method according to this application. The method may be used to resolve the foregoing problem. The method includes the following steps.

Step 401. An SMF receives a first message from a terminal, where the first message is used to request to establish a session.

Step 401 is the same as step 201, and reference may be made to the foregoing description.

Step 402. The SMF determines a first UPF for the terminal.

The SMF stores correspondences between a DNN and UPFs supported by the DNN. Therefore, the SMF can select a first UPF for the terminal based on the UPFs supported by the DNN.

For example, if UPFs that are supported by the DNN and that are stored in the SMF are a UPF 1, a UPF 2, and a UPF 3, the SMF can select one UPF from the UPF 1, the UPF 2, and the UPF 3 for the terminal. Specifically, the SMF allocates one UPF to the session that the terminal requests to establish. The allocated UPF may be referred to as the first UPF.

In addition, the selected first UPF is one of a plurality of UPFs managed by the SMF. It may also be understood that the first UPF is managed by the SMF.

Step 403. The SMF allocates, to the terminal based on correspondences between the first UPF and IP addresses supported by the first UPF, a first IP address supported by the first UPF.

The SMF stores IP addresses supported by UPFs managed by the SMF. In other words, the SMF stores the correspondences between the UPFs managed by the SMF and the IP addresses supported by the UPFs. In an implementation, the correspondences between the UPFs and IP addresses supported by the UPFs may be configured on the SMF in a preconfiguration manner. In another implementation, the SMF may separately request to obtain a correspondence between a UPF and an IP address supported by the UPF from each UPF managed by the SMF.

The correspondences that are between the UPFs and the IP addresses supported by the UPFs and that are stored in the SMF include the correspondences between the first UPF and the IP addresses supported by the first UPF.

IP addresses supported by any UPF in the UPFs managed by the SMF are some or all of IP addresses supported by the SMF.

FIG. 3 is used as an example. Assuming that the first UPF selected for the terminal in step 402 is the UPF 5, in step 402, the IP address allocated to the terminal by the SMF is one of IP 4 to IP 6. For example, if the IP address allocated to the terminal is IP 5, IP 5 may be referred to as the first IP address.

Step 404. The SMF sends the first IP address to the terminal, and notifies the first UPF to establish the session.

After the SMF allocates the first IP to the terminal and selects the first UPF, the SMF separately sends the first IP address to the terminal and the first UPF, and notifies the first UPF to establish the session for the terminal.

For details, refer to related descriptions in FIG. 2.

According to the foregoing method, the SMF allocates the first IP address and the first UPF to the terminal, and the first UPF allocated to the terminal supports the first IP address. This helps avoid allocating, to the terminal, a UPF that does not support the first IP address, and further helps avoid resource waste caused by re-allocating an IP address or reselecting an UPF for a plurality of times.

Figure 5:
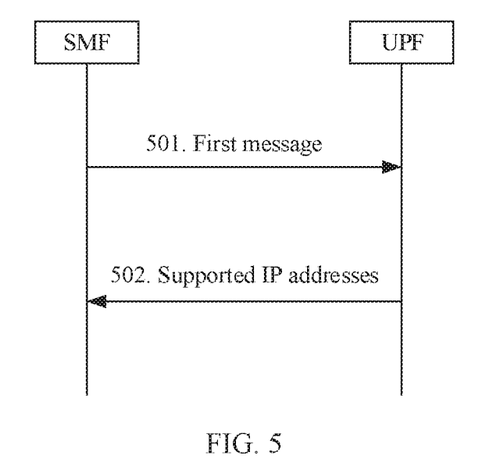
FIG. 5 is a schematic diagram of another session management method according to this application.

FIG. 5 shows another session management method according to this application. The method may be used by an SMF to obtain IP addresses supported by UPFs managed by the SMF. For example, in the embodiment shown in FIG. 2 or FIG. 4, when obtaining, from the UPF, the IP addresses supported by the UPF, the SMF may use the method in the embodiment. The method includes:

Step 501. The SMF sends a first message to the UPF, and correspondingly the UPF receives the first message sent by the SMF.

The first message may be, for example, a query message or a request message. For example, when the SMF or the UPF is powered on, the SMF sends an association setup request message, for example, an N4 association setup request, to a UPF managed by the SMF, to obtain IP addresses supported by the UPF. In other words, the association establishment request message is a specific implementation of the first message.

The UPF is the UPF managed by the SMF. Optionally, the UPF is deployed for a specific data network.

Step 502. The UPF sends, to the SMF, the IP addresses supported by the UPF, and correspondingly the SMF receives the IP addresses from the UPF.

In an implementation, the UPF can send an association setup response message, for example, an N4 association setup response, to the SMF that manages the UPF, where the association setup response message carries the IP addresses supported by the UPF.

For example, referring to FIG. 3, the SMF may separately send the first message to the UPF 4, the UPF 5, and the UPF 6, to separately request to obtain IP addresses supported by the UPF 4, IP addresses supported by the UPF 5, and IP addresses supported by the UPF 6. Then, the UPF 4, the UPF 5, and the UPF 6 separately send the IP addresses supported by the UPF 4, the UPF 5, and the UPF 6 to the SMF, so that the SMF can store the correspondences between the UPFs managed by the SMF and the IP addresses supported by the UPFs.

In another scenario, alternatively, one UPF may be managed by a plurality of SMFs, and the SMF is any one of the SMFs that manage the UPF.

In a possible implementation, the IP addresses that are supported by the UPF and that are sent to the SMF are some or all of the IP addresses supported by the SMF.

In still another possible implementation, if there are a plurality of SMFs that manage the UPF, when the IP addresses that are supported by the UPF and that are sent to the SMF are some of the IP addresses supported by the UPF, the UPF sends different IP addresses supported by the UPF to SMFs that manage the UPF.

For example, if an SMF 1, an SMF 2, and an SMF 3 simultaneously manage an UPF 1, and IP addresses supported by the UPF are IP 1 to IP 5, when the SMF 1, the SMF 2, and the SMF 3 separately request, from the UPF 1, to obtain the IP addresses supported by the UPF 1, the IP addresses separately sent by the UPF 1 to the SMF 1, the SMF 2, and the SMF 3 are different, and the IP addresses separately sent by the UPF 1 to the SMF 1, the SMF 2, and the SMF 3 are some of the IP addresses supported by the UPF. For example, the IP address that is supported by the UPF 1 and that is sent by the UPF 1 to the SMF 1 is IP 1, the IP address that is supported by the UPF 1 and that is sent by the UPF 1 to the SMF 2 is IP 2, and IP addresses that are supported by the UPF 1 and that are sent by the UPF 1 to the SMF 3 are IP 3 and IP 4. For another example, the IP addresses that are supported by the UPF 1 and that are sent by the UPF 1 to the SMF 1 are IP 1 and IP 2, the IP address that is supported by the UPF 1 and that is sent by the UPF 1 to the SMF 2 is IP 3, and the IP addresses that are supported by the UPF 1 and that are sent by the UPF 1 to the SMF 3 are IP 4 and IP 5. This is merely an example for description herein, and is not limited to the specific example.

According to the foregoing method, the SMF can obtain, from the UPF, the IP addresses supported by the UPF.

Therefore, when the UPF is allocated to the terminal, the UPF that supports the IP address allocated to the terminal is allocated to the terminal, thereby avoiding resource waste caused by re-allocating an IP address for a plurality of times.

The following describes the session management method with reference to a specific embodiment.

Figure 6:
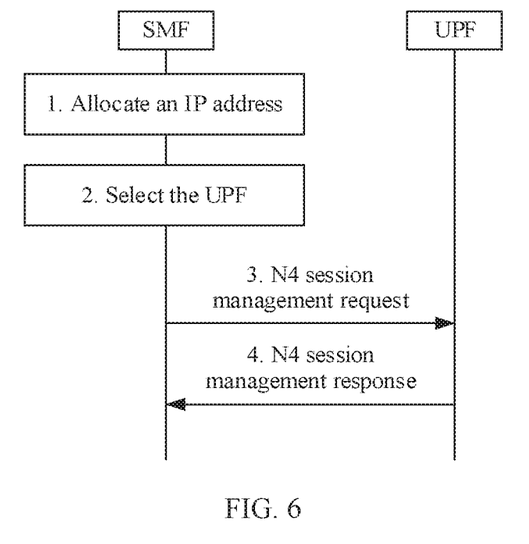
FIG. 6 is a schematic diagram of another session management method according to this application.

FIG. 6 is a schematic diagram of a session management method according to this application. The embodiment shown in FIG. 6 is a specific implementation of the embodiment shown in FIG. 2. In the embodiment shown in FIG. 6, an SMF first allocates an IP address, and then selects a UPF.

Step 1. The SMF allocates the IP address.

It should be noted that before step 1, the method further includes the session establishment procedure described in step 201. In the session establishment procedure, a terminal sends a first message to the SMF, where the first message includes information such as a DNN. For detailed descriptions, refer to related descriptions of step 201. Details are not described herein again.

For example, the SMF allocates the IP address to the terminal based on configuration information such as the DNN or network slicing selection assistance information (network slicing selection assistance information, NSSAI).

Step 2. The SMF selects a specific UPF based on the IP address allocated to UE.

Optionally, the method further includes the following steps.

Step 3. The SMF sends an N4 session management (for example, establishment or modification) request to the UPF.

In a session management procedure, the SMF sends a data packet processing rule to the selected UPF by using the N4 session management request. For example, the data packet processing rule includes a packet detection rule (packet detection rule, PDR), an execution rule, a forwarding action rule (forwarding action rule, FAR), and the like. The PDR may carry the IP address allocated to the terminal, and the IP address is used for data packet detection and processing, to be associated with the execution rule.

In the PDR, the IP address may be used as a source address (source IP address) or a destination address (destination IP address) in a packet filter (packet filter or traffic filter).

Optionally, the method further includes the following steps.

Step 4. The UPF sends an N4 session management response to the SMF.

In this embodiment, both the selectable UPF and the assignable IP address are constrained under one DNN. That the terminal requests to establish a session is to establish a data connection between the terminal and a specific data network. One DNN corresponds to one enterprise network. The DNN needs to be considered during UPF selection or IP address allocation.

Figure 7:
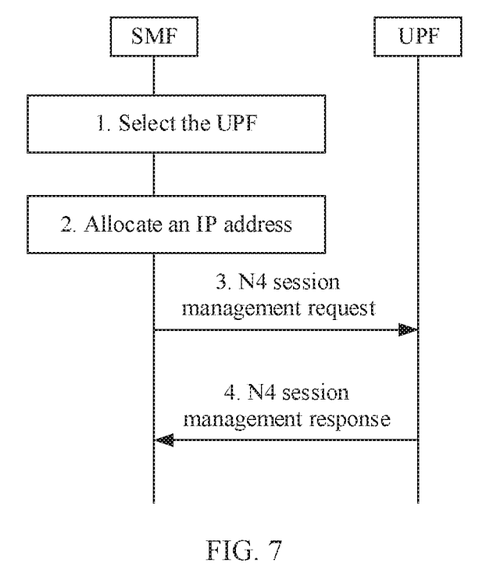
FIG. 7 is a schematic diagram of another session management method according to this application.

FIG. 7 is a schematic diagram of a session management method according to this application. The embodiment shown in FIG. 7 is a specific implementation of the embodiment shown in FIG. 4. In the embodiment shown in FIG. 7, an SMF first selects a UPF, and then allocates an IP address.

Step 1. The SMF selects the UPF.

For example, the SMF selects a UPF dedicated to an enterprise network based on information such as a DNN, NSSAI, and a location of a terminal.

It should be noted that before step 1, the method further includes the session establishment procedure described in step 401. In the session establishment procedure, the terminal sends a first message to the SMF, where the first message includes information such as the DNN. For detailed descriptions, refer to related descriptions of step 401. Details are not described herein again.

Step 2. The SMF allocates an IP address to the terminal based on IP addresses supported by the selected UPF.

Optionally, step 3 and step 4 are further included, and step 3 and step 4 are the same as step 3 and step 4 shown in FIG. 6. For details, refer to the foregoing descriptions.

In this embodiment, the SMF first selects a UPF under a specific condition, and the UPF may be deployed for a specific network. Then, the SMF allocates the IP address within a range of the IP addresses supported by the UPF to the terminal based on the correspondences between the UPF and the IP addresses, to ensure that the IP address allocated by the SMF is within the supported range of the selected UPF.

The solutions provided in this application are described above mainly from a perspective of interaction between network elements. It may be understood that, the network elements include corresponding hardware structures and/or software modules for performing the foregoing functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 8:
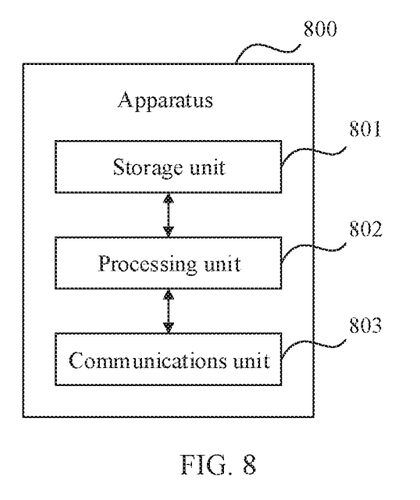
FIG. 8 is a schematic diagram of an apparatus according to this application.

Assume that an integrated unit is used. FIG. 8 is a possible schematic block diagram of an apparatus according to an embodiment of the present invention. An apparatus 800 may exist in a form of software, may be a session management network element, and may also be a chip in the session management network element. The apparatus 800 includes a processing unit 802 and a communications unit 803, where the communications unit 803 may include a receiving unit and a sending unit. The processing unit 802 is adapted to perform control management on an action of the apparatus 800. The communications unit 803 is adapted to support the apparatus 800 to communicate with another network entity (for example, a user plane network element). The apparatus 800 may further include a storage unit 801, adapted to store program code and data of the apparatus 800.

The processing unit 802 may be a processor or a controller, such as a general-purpose central processing unit (central processing unit, CPU), a general-purpose processor, digital signal processing (digital signal processing, DSP), an application specific integrated circuit (application specific integrated circuit, ASIC), a field programmable gate array (field programmable gate array, FPGA), or another programmable logical device, a transistor logical device, a hardware component, or any combination thereof. The controller/processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 803 may be a communications interface, a transceiver, a transceiver circuit, or the like. The communications interface is a general term. In specific implementation, the communications interface may include a plurality of interfaces, for example, may include an interface between a session management network element and a user plane network element, and/or another interface. The storage unit 801 may be a memory.

The processing unit 802 may support the apparatus 800 to perform actions of the SMF in the foregoing method examples. For example, the processing unit 802 may support the apparatus 800 to perform step 202 and step 203 in FIG. 2, step 402 to step 403 in FIG. 4, step 1 and step 2 in FIG. 6, and step 1 and step 2 in FIG. 7. The communications unit 803 may support communication between the apparatus 800 and the user plane network element. For example, the communications unit 803 may support the apparatus 800 to perform step 201 and step 204 in FIG. 2, step 401 and step 404 in FIG. 4, step 501 and step 502 in FIG. 5, step 3 and step 4 in FIG. 6, and step 3 and step 4 in FIG. 7.

Figure 9:
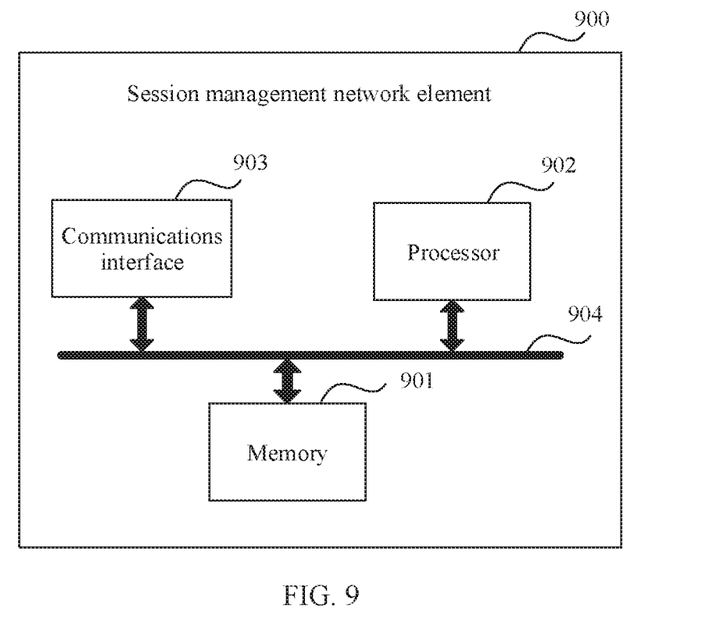
FIG. 9 is a schematic diagram of a session management network element according to this application.

When the processing unit 802 is a processor, the communications unit 803 is a communications interface, and the storage unit 801 is a memory, the apparatus 80 in the embodiment of the present invention may be a session management network element 900 shown in FIG. 9.

Referring to FIG. 9, the session management network element 900 includes a processor 902, a communications interface 903, and a memory 901. Optionally, the session management network element 900 may further include a bus 904. The communications interface 903, the processor 902, and the memory 901 may be connected to each another by using the bus 904. The bus 904 may be a PCI bus, an EISA bus, or the like. The bus 904 may be classified into an address bus, a data bus, a control bus, and the like. For ease of representation, only one thick line is used to represent the bus in FIG. 9, but this does not mean that there is only one bus or only one type of bus.

Figure 10:
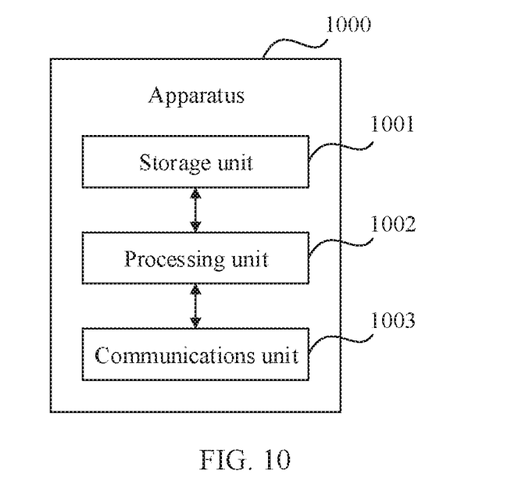
FIG. 10 is a schematic diagram of an apparatus according to this application.

Assume that an integrated unit is used. FIG. 10 is a possible schematic block diagram of an apparatus according to an embodiment of the present invention. An apparatus 1000 may exist in a form of software, may be a user plane network element, and may also be a chip in the user plane network element. The apparatus 1000 includes a processing unit 1002 and a communications unit 1003, where the communications unit 1003 may include a receiving unit and a sending unit. The processing unit 1002 is adapted to perform control management on an action of the apparatus 100. The communications unit 1003 is adapted to support the apparatus 1000 to communicate with another network entity (for example, a session management network element). The apparatus 1000 may further include a storage unit 1001, adapted to store program code and data of the apparatus 1000.

The processing unit 1002 may be a processor or a controller, for example, may be a CPU, a general purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 1003 may be a communications interface, a transceiver, a transceiver circuit, or the like. The communications interface is a general term. In specific implementation, the communications interface may include a plurality of interfaces, for example, may include an interface between a user plane network element and a session management network element, and/or another interface. The storage unit 1001 may be a memory.

The processing unit 1002 may support the apparatus 1000 to perform actions of the user plane network element in the method examples described above. The communications unit 1003 may support communication between the apparatus 1000 and a terminal. For example, the communications unit 1003 may support the apparatus 1000 to perform step 501 and step 502 in FIG. 5, step 3 and step 4 in FIG. 6, and step 3 and step 4 in FIG. 7.

Figure 11:
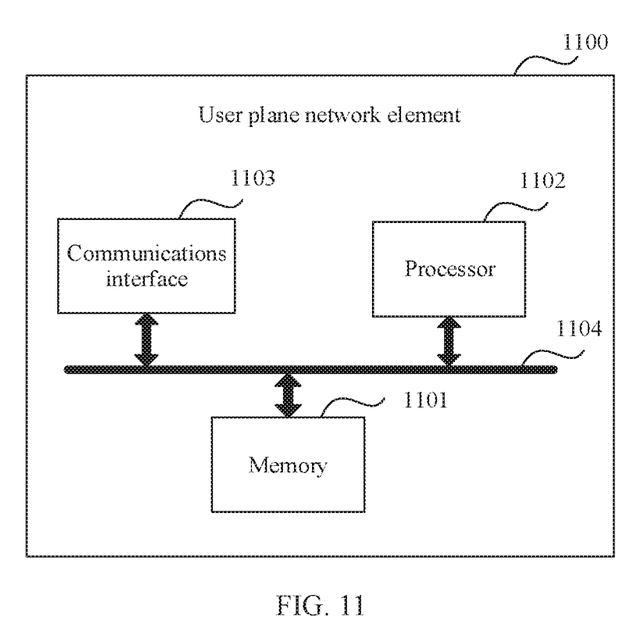
FIG. 11 is a schematic diagram of a user plane network element according to this application.

When the processing unit 1002 is a processor, the communications unit 1003 is a communications interface, and the storage unit 1001 is a memory, the apparatus 1000 in the embodiment of the present invention may be a user plane network element 1100 shown in FIG. 11.

Referring to FIG. 11, the user plane network element 1100 includes a processor 1102, a communications interface 1103, and a memory 1101. Optionally, the user plane network element 1100 may further include a bus 1104. The communications interface 1103, the processor 1102, and the memory 1101 may be connected to each other by using the bus 1104. The bus 1104 may be a PCI bus, an EISA bus, or the like. The bus 1104 may be classified into an address bus, a data bus, a control bus, and the like. For ease of representation, only one thick line is used to represent the bus in FIG. 11, but this does not mean that there is only one bus or only one type of bus.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk, SSD)), or the like.

The various illustrative logical units and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in terminal device. Alternatively, the processor and the storage medium may also be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely exemplary description of the present invention defined by the accompanying claims, and is considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A session management method, comprising:
   receiving, by a session management network element, a first message from a terminal, wherein the first message is used to request to establish a session, wherein the first message comprises a data network (DN) identifier, wherein the DN identifier is used to identify a data network to which the terminal requests to establish the session;
   obtaining, by the session management network element, correspondences between the DN identifier and a plurality of user plane network elements supported by the DN identifier;
   determining, by the session management network element based on the obtained correspondences between the DN identifier and the plurality of user plane network elements supported by the DN identifier, a first user plane network element for the terminal according to the DN identifier;
   allocating, by the session management network element to the terminal based on correspondences between the first user plane network element and internet protocol (IP) addresses supported by the first user plane network element and the DN identifier, a first IP address supported by the first user plane network element;
   sending, by the session management network element, the first IP address to the terminal; and
   notifying, by the session management network element, the first user plane network element to establish the session.

2. The method according to claim 1, wherein the method further comprises:
   obtaining, by the session management network element from the first user plane network element, the correspondences between the first user plane network element and the IP addresses supported by the first user plane network element; or
   configuring, by the session management network element, the correspondences between the first user plane network element and the IP addresses supported by the first user plane network element.

3. The method according to claim 1,
   wherein the determining, by the session management network element, a first user plane network element for the terminal according to the DN identifier comprises:
   determining, by the session management network element for the terminal, the first user plane network element supported by the DN identifier.

4. The method according to claim 1, wherein the notifying the first user plane network element to establish the session comprises:
   sending, by the session management network element, the first IP address to the first user plane network element.

5. A session management method, comprising:
   receiving, by a session management network element, a first message from a terminal, wherein the first message is used to request to establish a session, wherein the first message comprises a data network (DN) identifier, wherein the DN identifier is used to identify a data network to which the terminal requests to establish the session;
   obtaining, by the session management network element, correspondences between the DN identifier and a plurality of user plane network elements supported by the DN identifier;
   determining, by the session management network element based on the obtained correspondences between the DN identifier and the plurality of user plane network elements supported by the DN identifier, a first user plane network element for the terminal according to the DN identifier;
   allocating, by the session management network element to the terminal based on correspondences between the first user plane network element and internet protocol (IP) addresses supported by the first user plane network element and the DN identifier, a first IP address supported by the first user plane network element;
   sending, by the session management network element, the first IP address to the terminal;
   notifying, by the session management network element, the first user plane network element to establish the session;
   receiving, by a user plane network element, a second message of the session management network element, wherein the second message is used to request to obtain internet protocol (IP) addresses supported by the user plane network element; and sending, by the user plane network element to the session management network element, the IP addresses supported by the user plane network element;

sending, by the session management network element, the second message to the user plane network element; and receiving, by the session management network element, the IP addresses supported by the user plane network element.

6. The method according to claim 5, wherein the IP addresses that are supported by the user plane network element and that are sent to the session management network element are some or all of IP addresses supported by the session management network element.

7. The method according to claim 6, wherein if a plurality of session management network elements manage the user plane network element, when the IP addresses that are supported by the user plane network element and that are sent to the session management network element are some of the IP addresses supported by the user plane network element, the IP addresses that are supported by the user plane network element and that are sent to the session management network elements are different.

8. A session management network element, comprising: a non-transitory memory and at least one processor coupled to the non-transitory memory, wherein instructions stored in the non-transitory memory, when executed by the at least one processor, cause the session management network element to:

receive a first message from a terminal, wherein the first message is used to request to establish a session, wherein the first message comprises a data network (DN) identifier, wherein the DN identifier is used to identify a data network to which the terminal requests to establish the session;

obtain correspondences between the DN identifier and a plurality of user plane network elements supported by the DN identifier;

determine, based on the obtained correspondences between the DN identifier and the plurality of user plane network elements supported by the DN identifier, a first user plane network element for the terminal according to the DN identifier;

allocate, to the terminal based on correspondences between the first user plane network element and IP addresses supported by the first user plane network element and the DN identifier, a first internet protocol (IP) address supported by the first user plane network element;

send the first IP address to the terminal; and notify the first user plane network element to establish the session.

9. The session management network element according to claim 8, wherein the instructions further cause the session management network element to:

obtain, from the first user plane network element, the correspondences between the first user plane network element and the IP addresses supported by the first user plane network element; or configure the correspondences between the first user plane network element and the IP addresses supported by the first user plane network element.

10. The session management network element according to claim 8, wherein the instructions further cause the session management network element to:

determine, for the terminal, the first user plane network element supported by the DN identifier.

11. The session management network element according to claim 8, wherein the instructions further cause the session management network element to send the first IP address to the first user plane network element.

12. A session management system, comprising a user plane network element and a session management network element, wherein:

the session management network element is configured to:

receive a first message from a terminal, wherein the first message is used to request to establish a session, wherein the first message comprises a data network (DN) identifier, wherein the DN identifier is used to identify a data network to which the terminal requests to establish the session;

obtain correspondences between the DN identifier and a plurality of user plane network elements supported by the DN identifier;

determine, based on the obtained correspondences between the DN identifier and the plurality of user plane network elements supported by the DN identifier, a first user plane network element for the terminal according to the DN identifier;

allocate to the terminal based on correspondences between the first user plane network element and internet protocol (IP) addresses supported by the first user plane network element and the DN identifier, a first IP address supported by the first user plane network element;

send the first IP address to the terminal;

notify the first user plane network element to establish the session; and the user plane network element is configured to:

receive a second message of a session management network element, wherein the second message is used to request to obtain internet protocol (IP) addresses supported by the user plane network element; and send, to the session management network element, the IP addresses supported by the user plane network element;

the session management network element is further configured to:

send a second message to the user plane network element; and receive the IP addresses supported by the user plane network element.

13. The session management system according to claim 12, wherein the IP addresses that are supported by the user plane network element and that are sent to the session management network element are some or all of IP addresses supported by the session management network element.

14. The session management system according to claim 13, wherein if a plurality of session management network elements manage the user plane network element, when the IP addresses that are supported by the user plane network element and that are sent to the session management network element are some of the IP addresses supported by the user plane network element, the IP addresses that are sent to the session management network elements and that are supported by the user plane network element are different.

15. The session management system according to claim 12, wherein the session management network element is configured to:

determine, for the terminal, the first user plane network element supported by the DN identifier.

16. The session management system according to claim 12, wherein he session management network element is configured to:
send the first IP address to the first user plane network element.

17. The method according to claim 5, wherein the determining, by the session management network element, a first user plane network element for the terminal according to the DN identifier comprises:
determining, by the session management network element for the terminal, the first user plane network element supported by the DN identifier.

18. The method according to claim 5, wherein the notifying the first user plane network element to establish the session comprises:
sending, by the session management network element, the first IP address to the first user plane network element.

19. The method according to claim 1, wherein the method further comprises:
receiving, by the first user plane network element from the session management network element, a notification to establish the session.

* * * * *